US012592631B2

(12) United States Patent
Dumais et al.

(10) Patent No.: US 12,592,631 B2
(45) Date of Patent: Mar. 31, 2026

(54) LLC POWER CONVERTER WITH PWM SIGNALS TO TRUNCATE ON-TIME PERIOD

(71) Applicant: Microchip Technology Incorporated, Chandler, AZ (US)

(72) Inventors: Alex Dumais, Boise, ID (US); Andreas Reiter, Feldkirchen-Westerham (DE); Yong Yuenyongsgool, Gilbert, AZ (US); Stephen Bowling, Chandler, AZ (US); Timothy Phoenix, Pepperell, MA (US); Justin Oshea, Chandler, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 307 days.

(21) Appl. No.: 18/217,053

(22) Filed: Jun. 30, 2023

(65) Prior Publication Data

US 2024/0006982 A1 Jan. 4, 2024

Related U.S. Application Data

(60) Provisional application No. 63/357,365, filed on Jun. 30, 2022.

(51) Int. Cl.
H02M 3/335 (2006.01)
H02M 1/088 (2006.01)
(Continued)

(52) U.S. Cl.
CPC ............. H02M 1/088 (2013.01); H02M 3/01 (2021.05); H02M 3/33571 (2021.05); H02M 1/0009 (2021.05)

(58) Field of Classification Search
CPC .. H02M 3/1582; H02M 3/1584; H02M 3/285; H02M 3/33561; H02M 7/49;
(Continued)

(56) References Cited

U.S. PATENT DOCUMENTS

| | | | | |
|---|---|---|---|---|
| 8,860,393 B2 * | 10/2014 | Kronmueller | ........... | G05F 1/595 |
| | | | | 323/283 |
| 9,257,913 B1 * | 2/2016 | McDonald | .......... | H02M 3/3376 |

(Continued)

OTHER PUBLICATIONS

International Search Report and Written Opinion, Application No. PCT/US2023/026743, 12 pages, Sep. 19, 2023.

*Primary Examiner* — Crystal L Hammond
*Assistant Examiner* — Nusrat Quddus
(74) *Attorney, Agent, or Firm* — SLAYDEN GRUBERT BEARD PLLC

(57) ABSTRACT

An inductor-inductor-capacitor (LLC) power converter includes a current input interface to receive a current input indication. The current input indication includes a voltage to represent a current passing through of a primary side of the LLC power converter. The LLC power converter includes voltage input interface to receive a voltage input. The voltage input is to include a representative voltage to be provided from a secondary side of the LLC power converter. The LLC power converter includes a control circuit to generate pulsed-width modulation (PWM) control signals for the LLC power converter. The control circuit is to match an on-time period of a first leg and a second leg of the LLC power converter and based upon the current input indication and the voltage input.

20 Claims, 8 Drawing Sheets

(51) Int. Cl.
    *H02M 3/00*       (2006.01)
    *H02M 1/00*       (2006.01)

(58) Field of Classification Search
CPC ........ H02M 1/045; H02M 7/006; H02M 7/06;
H02M 7/068; H02M 7/153; H02M 7/10;
H02M 1/088; H02M 7/103; H02M 7/106;
H02M 7/19; H02M 7/08; H02M 7/17;
H02M 2001/007; H02M 7/493; H02M
7/53806; H02M 7/5381; H02M 7/483;
H02M 7/217; H02M 7/538466; H02M
7/5387; H02M 7/53871; H02M 7/53873;
H02M 7/53875; H02M 1/084; H02M
1/0845; H02M 3/07; H02M 3/073; H02M
2003/071; H02M 2003/072; H02M
2003/075; H02M 2003/076; H02M
2003/077; H02M 2003/078; H02M
2001/0048; H02M 7/519; H02M 7/521;
H02M 7/523; H02M 7/75; H02M 7/757;
H02M 7/7575; H02M 7/66; H02M 7/68;
H02M 7/72; H02M 2007/4835; H02M
7/487; H02M 1/08; H02M 7/515; H02M
7/525; H02M 7/527; H02M 7/529; H02M
7/539; H02M 5/2573; H02M 1/081;
H02M 5/293; H02M 7/12; H02M 3/10;
H02M 3/125; H02M 3/13; H02M 3/135;
H02M 3/145; H02M 3/15; H02M 3/155;
H02M 3/156; H02M 3/158; H02M
3/1588; H02M 3/1566; H02M
2003/1557; H02J 3/46; H02J 3/38; G05F
1/00; G05F 1/10; G05F 1/12; G05F 1/46;
G05F 1/455; G05F 1/45; G05F 1/445;
G05F 1/66; G05F 1/40; G05F 1/42; G05F
1/44; G05F 1/462; G05F 1/52; G05F
1/56; G05F 3/10; G05F 3/16; G05F 3/18;
G05F 3/185; G05F 3/20; G05F 3/26;
G05F 3/30; G05F 3/205; G05F 3/22;
G05F 3/24; G05F 3/222; G05F 3/242;
G05F 3/225; G05F 3/227; G05F 3/245;
G05F 3/247; G05F 3/262; G05F 3/265;
G05F 3/267; G05F 1/575; H05B 39/048;
B23K 11/24; H04B 2215/069
See application file for complete search history.

(56)              References Cited

U.S. PATENT DOCUMENTS

| | | | |
|---|---|---|---|
| 9,602,001 B1* | 3/2017 | Hung ..................... | H02M 3/158 |
| 10,686,382 B2* | 6/2020 | Bianco ................ | H02M 3/3376 |
| 2009/0027024 A1* | 1/2009 | Dequina ................. | H02M 1/38 |
| | | | 323/283 |
| 2009/0091957 A1 | 4/2009 | Orr et al. ......................... | 363/79 |
| 2009/0230936 A1* | 9/2009 | Isham .................. | H02H 7/1227 |
| | | | 324/123 R |
| 2010/0327838 A1* | 12/2010 | Melanson ............. | H02M 3/156 |
| | | | 323/311 |
| 2012/0091982 A1 | 4/2012 | Colbeck et al. .............. | 323/282 |
| 2014/0268907 A1* | 9/2014 | Cinagrossi ........ | H02M 3/33507 |
| | | | 363/21.02 |
| 2018/0191252 A1* | 7/2018 | Bianco ..................... | H02M 3/01 |
| 2019/0044430 A1* | 2/2019 | Moon ................. | H02M 3/3376 |
| 2022/0321004 A1* | 10/2022 | Plojhar .............. | H02M 1/0025 |
| 2022/0345035 A1* | 10/2022 | Mazgut .............. | H02M 1/0019 |
| 2023/0088584 A1* | 3/2023 | Panov ................ | H02M 1/0009 |
| | | | 323/271 |
| 2023/0299674 A1* | 9/2023 | Liu .......................... | H02M 3/06 |
| | | | 323/271 |
| 2025/0105729 A1* | 3/2025 | Malinin .................. | H02M 3/01 |

* cited by examiner

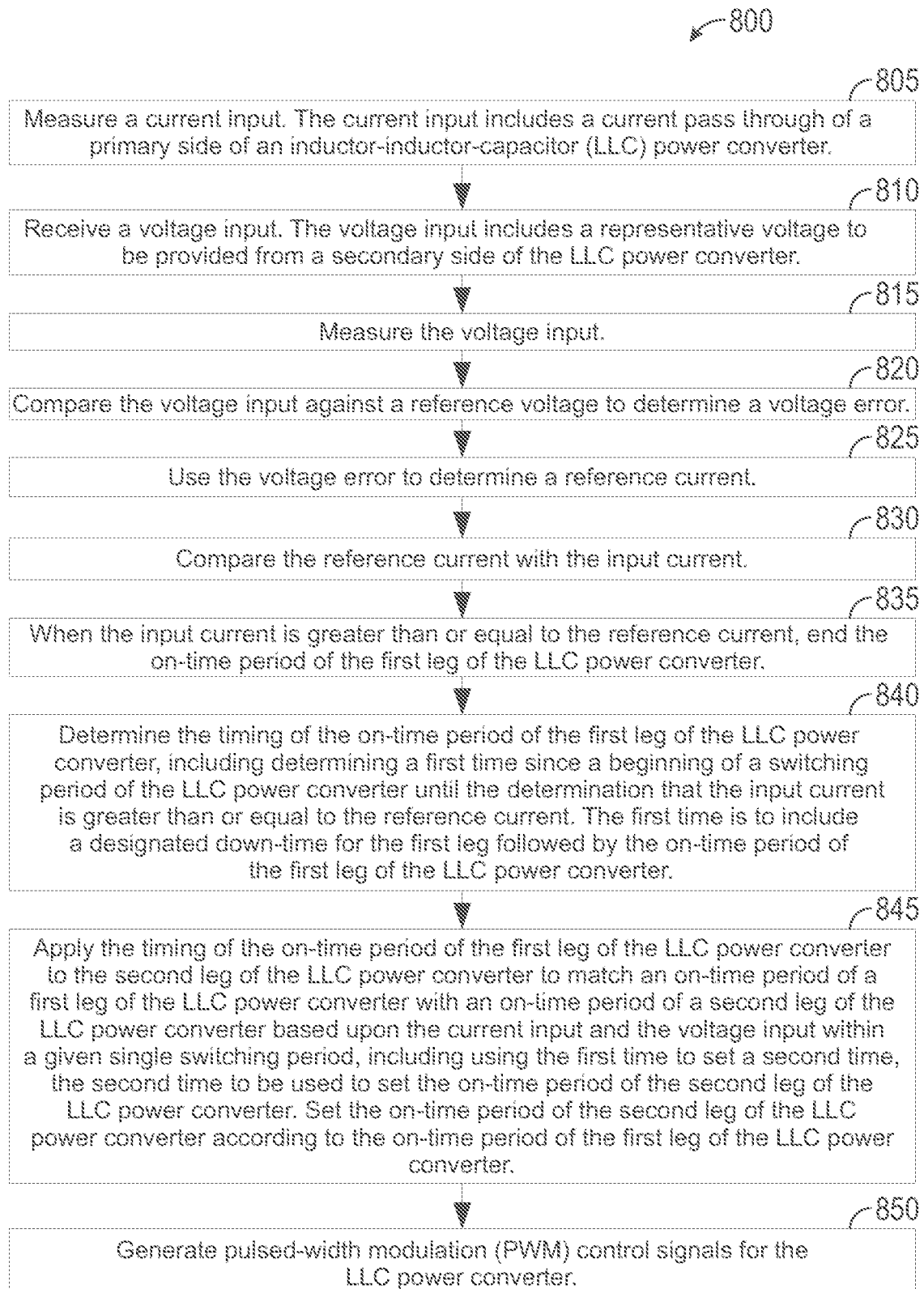

─800

805

Measure a current input. The current input includes a current pass through of a primary side of an inductor-inductor-capacitor (LLC) power converter.

810

Receive a voltage input. The voltage input includes a representative voltage to be provided from a secondary side of the LLC power converter.

815

Measure the voltage input.

820

Compare the voltage input against a reference voltage to determine a voltage error.

825

Use the voltage error to determine a reference current.

830

Compare the reference current with the input current.

835

When the input current is greater than or equal to the reference current, end the on-time period of the first leg of the LLC power converter.

840

Determine the timing of the on-time period of the first leg of the LLC power converter, including determining a first time since a beginning of a switching period of the LLC power converter until the determination that the input current is greater than or equal to the reference current. The first time is to include a designated down-time for the first leg followed by the on-time period of the first leg of the LLC power converter.

845

Apply the timing of the on-time period of the first leg of the LLC power converter to the second leg of the LLC power converter to match an on-time period of a first leg of the LLC power converter with an on-time period of a second leg of the LLC power converter based upon the current input and the voltage input within a given single switching period, including using the first time to set a second time, the second time to be used to set the on-time period of the second leg of the LLC power converter. Set the on-time period of the second leg of the LLC power converter according to the on-time period of the first leg of the LLC power converter.

850

Generate pulsed-width modulation (PWM) control signals for the LLC power converter.

FIG. 8

LLC POWER CONVERTER WITH PWM SIGNALS TO TRUNCATE ON-TIME PERIOD

PRIORITY

This application claims priority to U.S. Provisional Patent Application No. 63/357,365 filed Jun. 30, 2022, the contents of which are hereby incorporated in their entirety.

TECHNICAL FIELD

The present disclosure relates to pulsed-width modulation (PWM) devices and, more particularly, a PWM and support for the PWM for inductor-inductor-capacitor (LLC) resonant converters utilizing charge current control.

BACKGROUND

Resonant converters, such as LLC resonant converters, with soft-switching capabilities have become a popular topology among direct-current to direct-current (DC-DC) power converters in applications such as server, industrial, and electric vehicle (EV) power supplies. A traditional control strategy is voltage-mode control. However, inventors of examples of the present disclosure have discovered that voltage-mode control may have drawbacks with dynamic response as the high order plant transfer function of a converter varies with input voltage/load. Inventors of examples of the present disclosure have discovered that an inner average current loop may be added to improve dynamic response, but that this may significantly increase complexity, and may use a heavy low pass filter (sinusoidal current) resulting in minor improvements.

Inventors of examples of the present disclosure have discovered that, in order to use charge control for resonant converters (which might not utilize a heavy low pass filter and may improve dynamic performance), the push and pull legs of a power converter should be balanced, but cannot be balanced with an external current reset signal, as such external current reset signals are insufficiently fast to be handled within a given, single PWM period.

SUMMARY

According to one example, a system may include an apparatus. The apparatus may include a current input interface to receive a current input, the current input to include a current pass through of a primary side of an inductor-inductor-capacitor (LLC) power converter. According to the same or different example, the apparatus may include a voltage input interface to receive a voltage input, the voltage input to include a representative voltage to be provided from a secondary side of the LLC power convert. In examples, the apparatus may include a control circuit to generate pulsed-width modulation (PWM) control signals for the LLC power converter, wherein the control circuit is to match an on-time period of a first leg of the LLC power converter and an on-time period of a second leg of the LLC power converter based upon the current input and the voltage input.

Another example provides a method. The method may include receiving a current input, the current input to include a current pass through of a primary side of an inductor-inductor-capacitor (LLC) power converter. In the same or different example, the method may include receiving a voltage input, the voltage input to include a representative voltage to be provided from a secondary side of the LLC power converter. In some examples, the method may include generating pulsed-width modulation (PWM) control signals for the LLC power converter, wherein the control circuit is to match an on-time period of a first leg of the LLC power converter and an on-time period of a second leg of the LLC power converter based upon the current input and the voltage input.

In other examples, a system may include an LLC power converter. The LLC power converter may include a first leg including a first switch. In the same or different examples, the LLC power converter may include a second leg including a second switch, the second switch connected between a voltage supply and the first switch, the first switch connected between the second switch and ground, wherein a junction between the first switch and the second switch is to form a midpoint. In an example, the LLC power converter may include a transformer including a primary side inductor and a secondary side inductor. The LLC power converter may include a low side inductor connected between the midpoint and the primary side inductor. In the same or different examples, the LLC power converter may include a low side capacitor connected between the primary side inductor and ground. The LLC power converter may include a current sensor connected between the low side capacitor and the primary side inductor, the current sensor to generate a current feedback. The LLC power converter may include a voltage output connected to the second side inductor. In the same or different examples, the LLC power converter may include a control circuit to receive the current feedback, receive the voltage output, and based upon the current feedback and the voltage output, generate pulsed-width modulation (PWM) control signals for the first leg and the second leg to truncate an on-time period of the first leg and match an on-time period of the second leg and the on-time period of the first leg.

BRIEF DESCRIPTION OF THE DRAWINGS

The figures illustrate example methods and systems for a PWM and support for the PWM for LLC resonant converters utilizing charge current control.

FIG. 8 illustrates a flow chart of an example method for the PWM charge current control in LLC resonant converters.

The reference number for any illustrated element that appears in multiple different figures has the same meaning across the multiple figures, and the mention or discussion herein of any illustrated element in the context of any particular figure also applies to each other figure, if any, in which that same illustrated element is shown.

DETAILED DESCRIPTION

Inventors of examples of the present disclosure have discovered that, using a charge control for resonant converters may have benefits including not requiring use of a heavy low pass filter and may improve dynamic performance, and the resultant transfer function may be a single pole system which is not impacted by operating mode or load. Inventors of examples of the present disclosure have discovered such examples that may address one or more of these identified problems or provide one or more of these benefits.

Figure 1:
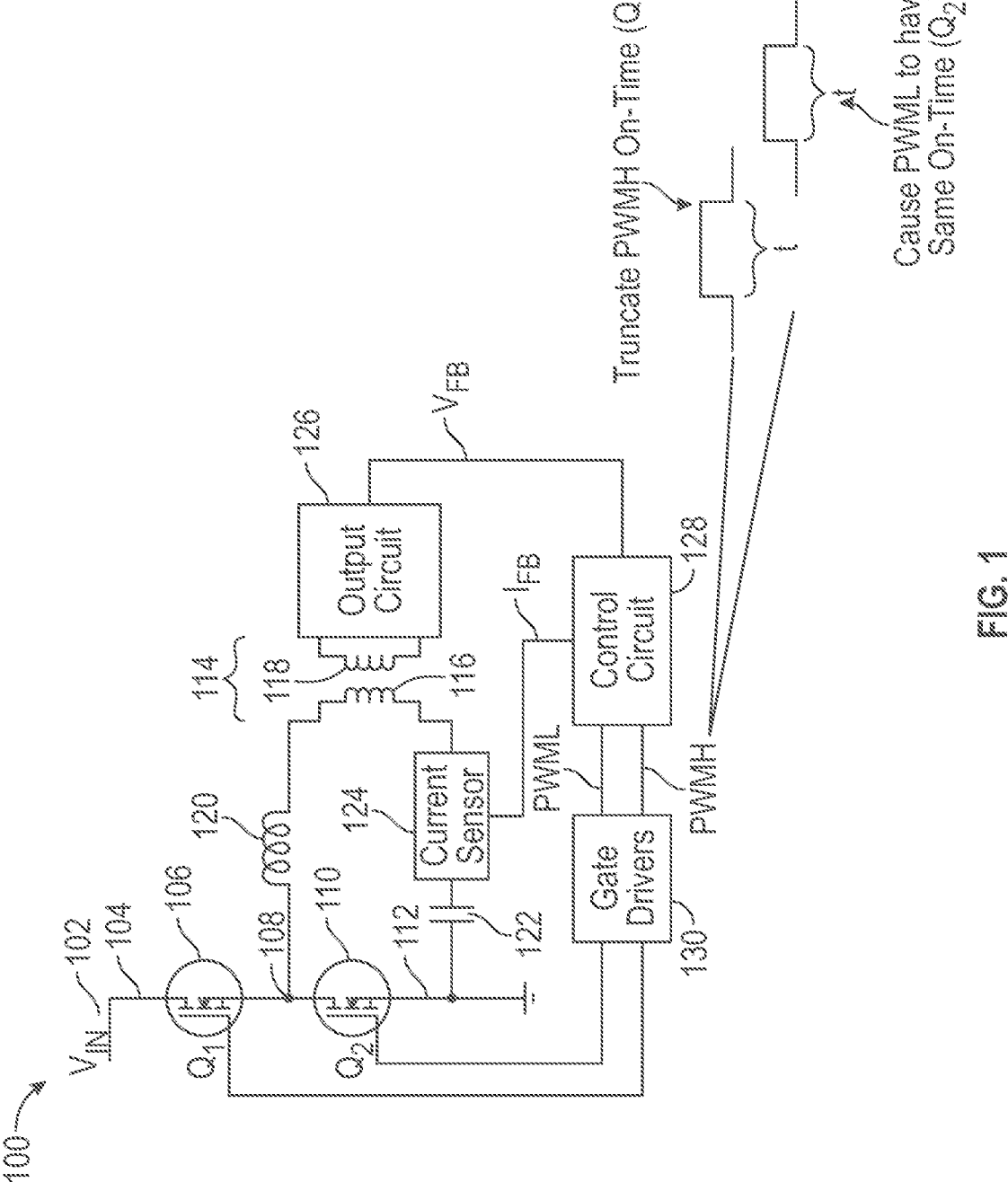
FIG. 1 is an illustration of an example LLC converter, according to examples of the present disclosure.

FIG. 1 is an illustration of an example LLC converter 100, according to examples of the present disclosure. Although LLC converter 100 is illustrated as an example, the present disclosure may apply to any suitable resonant converter. Moreover, although an example implementation of LLC converter 100 is shown, any suitable implementation may be used. LLC converter 100 may be implemented as a DC-DC voltage converter. LLC converter 100 may be implemented within any suitable context, such as within a power supply, vehicle, computer, appliance, consumer device, microcontroller, or other suitable device. LLC converter 100 may be configured to perform charge current control in order to perform PWM signal generation.

LLC converter 100 may be configured to receive a voltage supply or input voltage, denoted in FIG. 1 as VIN 102, and convert the voltage of VIN 102 to an output voltage. The output voltage may be provided to any suitable consumer of voltage. LLC converter 100 may provide a constant and regulated voltage to such a consumer.

LLC converter 100 may include a first leg 104 and a second leg 112 of a half-bridge rectifier. First leg 104 and second leg 112 may be connected at a respective end thereof to a midpoint 108. First leg 104 may be connected at another end to VIN 102. Second leg 112 may be connected at another end to ground. First leg 104 and second leg 112 may each include respective switches 106, 110. Switches 106, 110 may be implemented in any suitable manner, such as with transistors. Any suitable transistors may be used, such as n-channel metal-oxide-semiconductor field-effect transistors (MOSFETs).

LLC converter 100 may include a transformer 114 with a primary side inductor 116 and a secondary side inductor 118, with primary side inductor 116 magnetically coupled to secondary side inductor 118. LLC converter 100 may include a low side inductor 120 connected between midpoint 108 and primary side inductor 116. Transformer 114 may be step up or step down voltage based upon respective numbers of wirings or loops in primary side inductor 116 and secondary side inductor 118. Output of LLC converter 100 may be provided as output of secondary side inductor 118. LLC converter 100 may include an output circuit 126, implemented by analog circuitry, digital circuitry, application specific integrated circuits (ASIC), field programmable gate arrays (FPGA), reconfigurable logic, programmable logic devices (PLDs), instructions for execution by a processor, or any suitable combination thereof. Output circuit 126 may be configured to provide any suitable signal conditioning or manipulation upon the output of secondary side inductor 118 for output of converter 100 or for feedback back into converter 100 as a representative voltage $V_{FB}$.

LLC converter 100 may include a current sensor 124. Current sensor 124 may be implemented by analog circuitry, digital circuitry, ASIC, FPGA, PLD, reconfigurable logic, instructions for execution by a processor, or any suitable combination thereof. Current sensor 124 may be configured to measure a pass-through current from secondary side inductor 116. Current sensor 124 may be configured to generate a voltage signal that represents this current, given by current input indication $I_{FB}$.

LLC converter 100 may include a capacitor 122. Capacitor 122 may be coupled between ground and primary side inductor 116. Moreover, current sensor 124 may be connected at any suitable place with respect to transformer 114, ground, and capacitor 122, i.e., current sensor 124, capacitor 122 and primary side inductor 116 are coupled in series.

In one example, LLC converter 100 may include a control circuit 128. In another example, LLC converter 100 may be communicatively coupled to control circuit 128. Control circuit 128 may be implemented by analog circuitry, digital circuitry, ASIC, FPGA, PLD, reconfigurable logic, instructions for execution by a processor, or any suitable combination thereof. Control circuit 128 may be configured to generate PWM signals for legs 104, 112 and respective switches 106, 110 therein. For example, control circuit 128 may generate a PWMH signal for leg 104 and switch 106 and a PWML signal for leg 112 and switch 110. LLC converter 100 may include gate drivers 130 configured to provide signal conditioning for PWML and PWMH signals as output from control circuit 128 to be applied to switches 106, 110, respectively.

Control circuit 128 may be configured to receive representative voltage $V_{FB}$ from secondary side inductor 118 and current input indication $I_{FB}$ from current sensor 124. Representative voltage $V_{FB}$ may be received from secondary side inductor 118 through output circuit 126. Control circuit 128 may be configured to receive current input indication $I_{FB}$ from current sensor 124. Control circuit 128 may be configured to generate PWM signals such as PWMH and PWML to match an on-time period of first leg 108 of the LLC power converter and an on-time period of a second leg of the LLC power converter based upon the current input indication $I_{FB}$ and the representative voltage $V_{FB}$.

Moreover, based upon the current input indication $I_{FB}$ and the representative voltage $V_{FB}$, control circuit 128 may be configured to generate PWM control signals such as PWML and PMWH control signals for first leg 104 and second leg 112, respectively, to truncate an on-time period of first leg 104 and switch 106 (switch 106 also denoted as $Q_1$) and match an on-time period of second leg 112 and switch 110 (switch 110 also denoted as $Q_2$) so as to match the on-time period of first leg 104, and switch 106, and the on-time period of second leg 112 and switch 110. Thus, the truncation may be performed on PWMH.

Control circuit 128 may be configured to generate PWM control signals such as PWML and PWMH by truncating the PWMH signal, at a time t after the beginning of the on-time period of PWMH, and matching the on-time period of the PWML signal with the value of time t.

Figure 2:
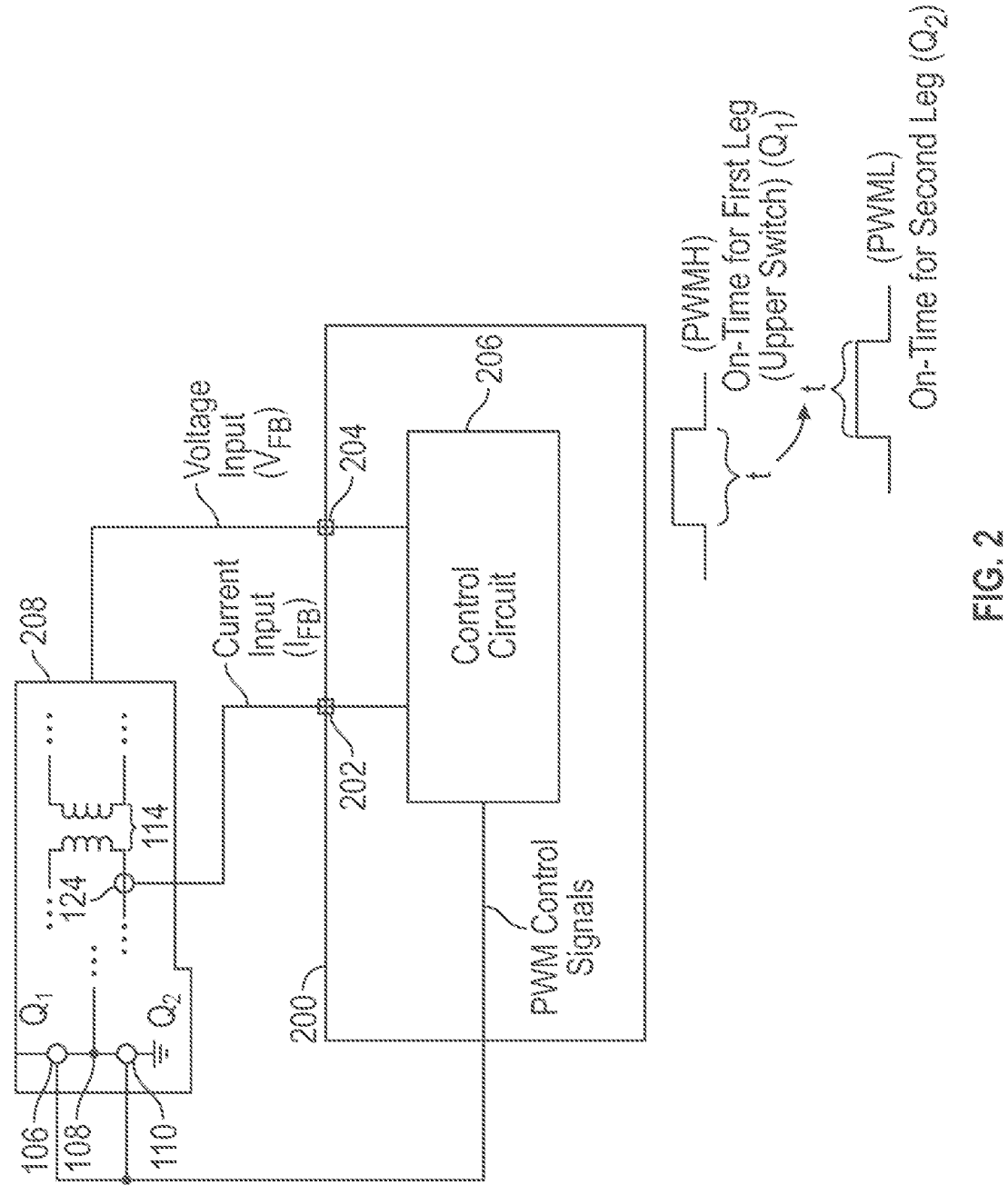
FIG. 2 is an illustration of an apparatus, according to examples of the present disclosure.

FIG. 2 is an illustration of an apparatus 200, according to examples of the present disclosure. Apparatus 200 may be configured to perform charge current control in order to perform PWM signal generation. Apparatus 200 may implement portions of LLC converter 100 of FIG. 1. Specifically, apparatus 200 may implement control circuit 128.

Apparatus 200 may include control circuit 206. Control circuit 206 may implement, fully or in part, control circuit 128. Control circuit 206 may be implemented by analog circuitry, digital circuitry, ASIC, FPGA, PLD, reconfigurable logic, instructions for execution by a processor, or any suitable combination thereof.

Apparatus 200 may include an interface 202 to receive an input such as current input indication $I_{FB}$ and an interface 204 to receive an input such as representative voltage $V_{FB}$. Shown in FIG. 2 are portion 208 of an LLC converter, which may include portions of LLC converter 100 shown in FIG.

1. Apparatus 200 may be included within such an LLC converter or may be communicatively coupled to such an LLC converter.

Control circuit 206 may be configured to cause PWMH and PWML signals such that control circuit 128 is to match an on-time period of first leg 104 and switch 106 and an on-time period of second leg 112 and switch 110 based upon current input indication $I_{FB}$ and representative voltage $V_{FB}$ received through interfaces 202, 204 respectively.

As shown in FIG. 2, control circuit 206 is to cause the on-time period of second leg 112 and switch 110 therein (also denoted as $Q_2$) to match the on-time period of first leg 104 and switch 106 therein (also denoted as $Q_1$), which may include determining the timing (t) of the on-time period of first leg 104 and switch 106 therein and applying the timing (t) of the on-time period of first leg 104 and switch 106 to second leg 112. Control circuit 106 may thus apply an identical on-time period of first leg 104 to second leg 112.

Figure 3:
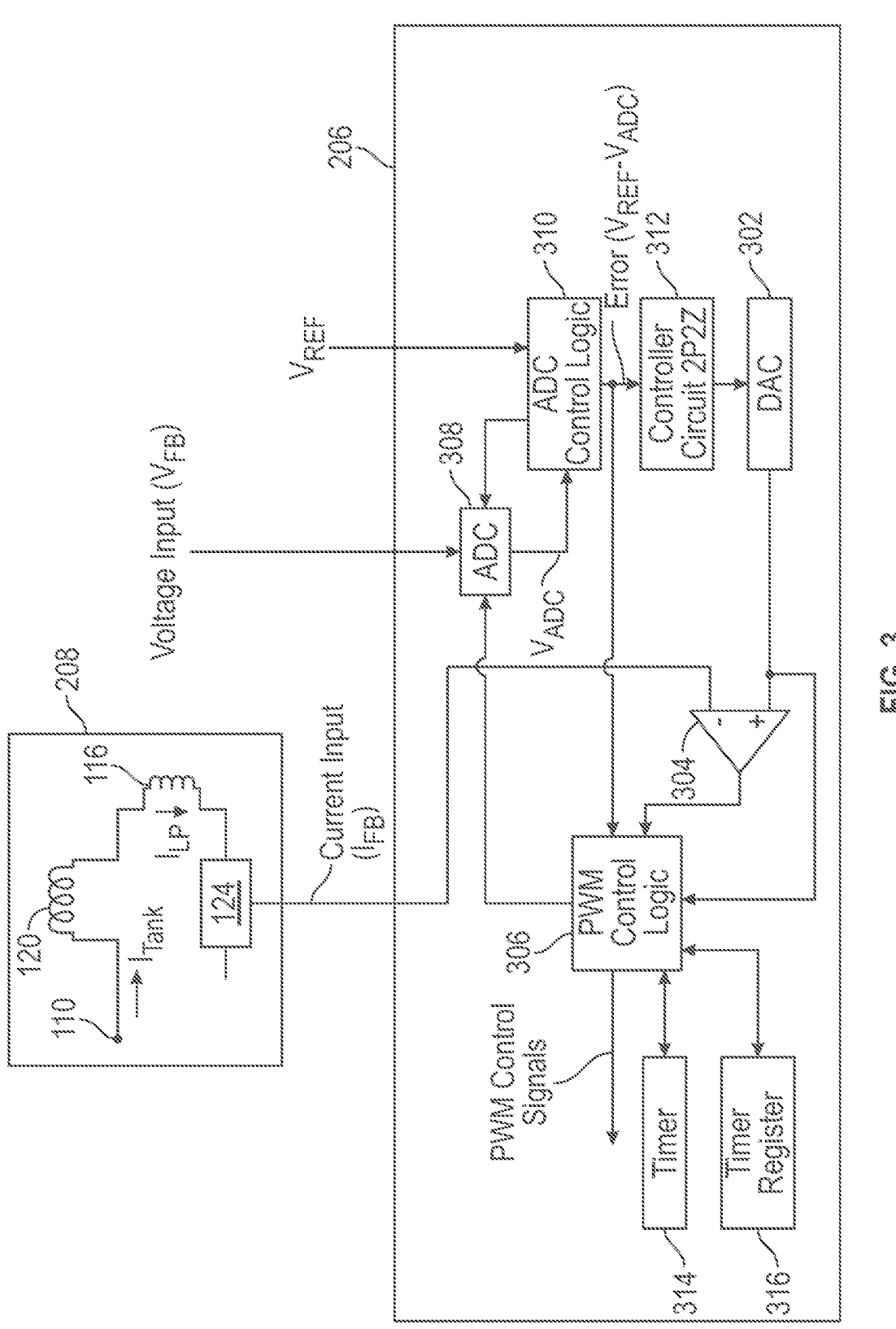
FIG. 3 is an illustration of a control circuit, according to examples of the present disclosure.

FIG. 3 is a more detailed illustration of control circuit 206 or control circuit 128, according to examples of the present disclosure.

Control circuit 206 may include a digital to analog converter (DAC) 302, a comparator 304, PWM control logic 306, analog to digital converter (ADC) 308, ADC control logic 310, and a controller circuit 312, each implemented in any suitable manner, such as by analog circuitry, digital circuitry, ASIC, FPGA, PLD, reconfigurable logic, instructions for execution by a processor, or any suitable combination thereof.

Representative voltage $V_{FB}$ may be received at ADC 308 (e.g., through interface 204—see FIG. 2). ADC 308 may be configured to sample representative voltage $V_{FB}$ and output a digital signal indicative of a value of representative voltage $V_{FB}$. The digital signal indicative of the value of representative voltage $V_{FB}$ (shown as $V_{ADC}$) may be provided to ADC control logic 310 and to any other suitable part of control circuit 206.

ADC control logic 310 may be configured to use $V_{ADC}$ for comparison against a reference voltage, given as $V_{REF}$. $V_{REF}$ may be implemented as a digital value for target output of converter 100 based upon specified gains of feedback to ADC. ADC control logic 310 may be configured to determine the difference between VA Dc and $V_{REF}$, yielding a voltage error. The voltage error may be provided to controller circuit 312. Moreover, ADC control logic 310 may be configured to cause the sampling of data at ADC 308.

Controller circuit 312 may be a 2-zero 2-pole (2P2Z) controller that has 2 poles and 2 zeros in its transfer function. The transfer function may be written as a linear difference equation that gives appropriate filter response as designed based on digital coefficients or weighting. Such an equation may be, for example, $u[n]=B_0*e[n]+B_1*e[n-1]+B_2*e[n-2]-A_1*u[n-1]-A_2*u[n-2]$, where $A_x$ and $B_x$ are coefficients determined through experimentation, e is the error calculated from ADC control logic 310, u is controller circuit 312 output. Thus, the equation may take into account previous operations and measurements so as to identify imbalances in the response of converter 100. The coefficients, sample rate, and other factors determine how controller circuit 312 responds to a disturbance or imbalance in converter 100. The coefficients may be selected so as to regulate controller circuit 312 across different anticipated line or load conditions to give proper transient response, or to eliminate sub-harmonic oscillations for the current loop which is action as peak current mode control. Accordingly, raw feedback input in the form of $V_{FB}$ might not be simply used as the current reference, but instead may be filtered through controller circuit 312. Such filtering may accommodate the conditions described above, such as imbalances in the response of converter 100. Thus, a voltage control loop controlling $V_{FB}$ may be used to set the threshold for operation of the current control loop controlling the current feedback.

Controller circuit 312 may yield a digital representation of a current reference, given as $I_{REF}$. The digital representation of $I_{REF}$ may be provided to DAC 302, which may generate an analog version of the digital representation of $I_{REF}$ which may then be provided to comparator 304.

Current reference value IREF may be provided to control logic 306 and to a non-inverting input of comparator 304. Current input indication $I_{FB}$ may be provided to an inverting input of comparator 304 (e.g., through interface 202—see FIG. 2), and to an input of control logic 306. Thus, comparator 304 may provide an indication of whether current input indication $I_{FB}$ has exceeded current reference value IREF, and this indication may be provided to PWM control logic 306. PWM control logic 306 may selectively activate DAC 302 to start or stop the sampling of representative voltage $V_{FB}$.

The value of current reference value IREF may be selectively changed by controller circuit 312. The value of current reference value IREF may affect the amount of current allowed to circulate in portion 208 of converter 100. The rate of change of current reference value IREF may be controlled by parameters such as initial DAC starting voltage for DAC 302, time at which ADC 308 or DAC 302 are triggered, and the ramp rate of DAC 302. The slope of current reference value IREF may provide stability compensation for the control loop of the input current to be stable over a variety of conditions. The value of current reference value IREF may be further selectively changed by controller circuit 312 so as to cause it to represent a demand for current in the resonant loop of inverter 100.

PWM control logic 306 may utilize any suitable number and kind of elements to save the timing of signals so that ON portions of PWMH and PWML signals within a given switch cycle may match. For example, PWM control logic 306 may include a timer 314. Timer 314 may be configured to count up or count down in terms of clock cycles or actual time. Timer 314 may be used to count cycles of a PWMH signal. Timer 314 may be operated in part using values in a timer register 316. Such values may include, for example, a maximum time that timer 314 is to operate to measure a PWMH signal.

Figure 4:
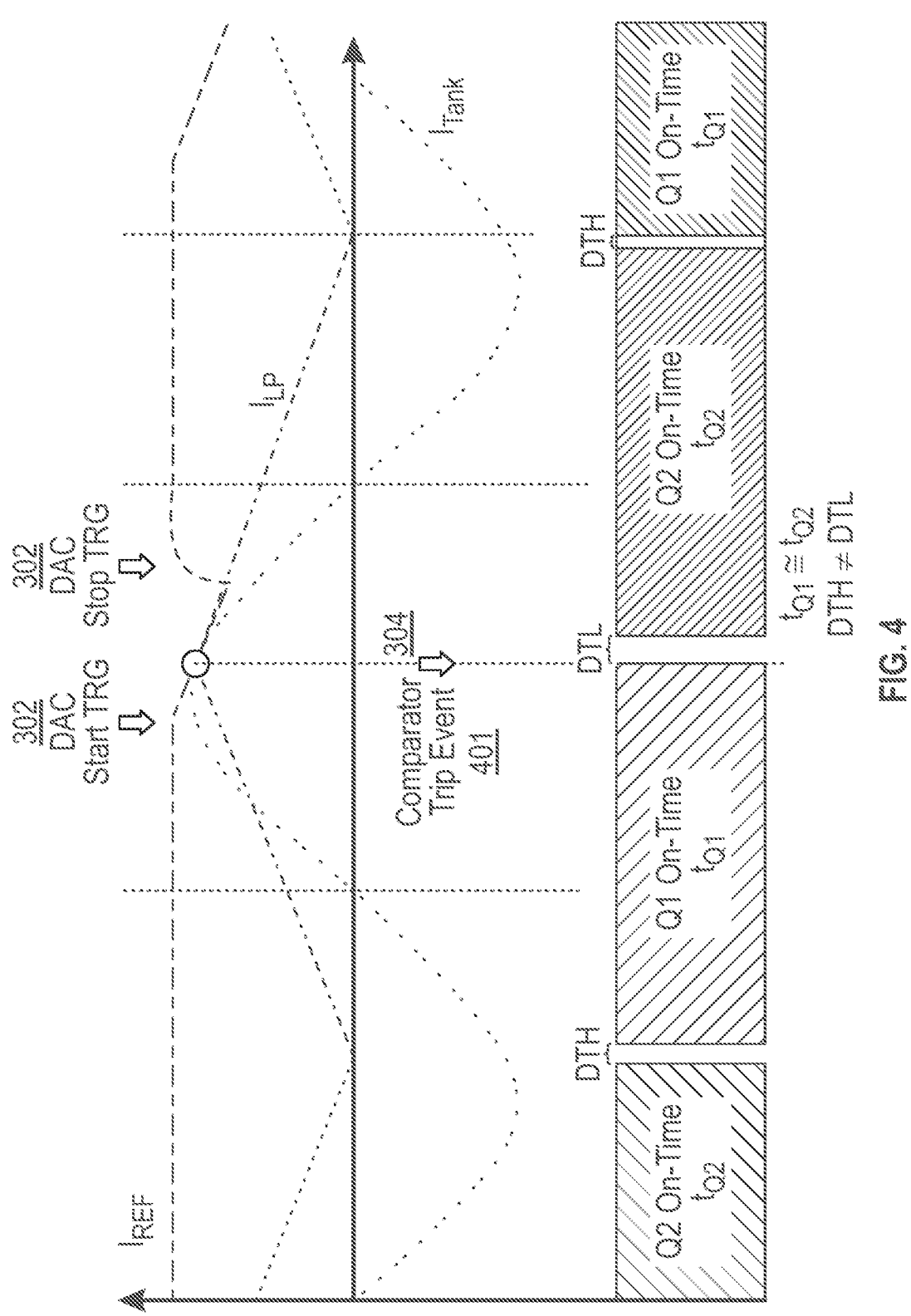
FIG. 4 is an illustration of timing of operation of a control circuit, according to examples of the present disclosure.

FIG. 4 is an illustration of timing of operation of control circuit 206 or control circuit 128, according to examples of the present disclosure.

Illustrated in FIG. 4 are graphs for values over time for current reference value IREF, $I_{LP}$ (which may be represented by current input indication $I_{FB}$) which may be the pass-through current of primary side inductor 116, and ITANK which may be the current through low side inductor 120. Current reference value IREF may be set at a particular initial, starting value that may be programmed into DAC 302. This may be performed by, for example, ADC control logic 310. Current reference value IREF may be a steady state value until DAC 302 is triggered, at which point current reference value IREF may be ramped, up or down, at a rate according to parameters set by controller circuit 312. IREF may be ramped up or down based on DAC data settings and trigger events. For peak current mode control systems, a ramp down may be performed after approximately 50% of a duty cycle has been reached.

When $I_{LP}$ (or current input indication $I_{FB}$) becomes greater than or equal to current reference value IREF, then comparator 304 may generate a notification or generate a trip event. This is denoted as 401.

A single switching cycle may include dedicated dead-time of first leg 104 and switch 106 (also denoted as $Q_1$). The dead-time may also be applied to second leg 112 and switch 110 (also denoted as $Q_2$) such that both switches 106, 110 are off at the same time. Such dedicated dead-time may be denoted as DTH as it may be specified as part of the PWMH signal. This dead-time may include causing switch 106 and switch 110 to be switched off. Following DTH may be an on-time of first leg 104 and switch 106, which switch 110 is held off. The on-time of switch 106 may be denoted as $t_{Q1}$. This on-time may include causing switch 106 to be switched on. Following the on-time $t_{Q1}$ of first leg 104 and switch 106 may be dedicated dead-time of switch 106 and switch 110. Such dedicated dead-time may be denoted as DTL as it may be specified as part of the PWMH signal. Following DTL may be on-time of second leg 112 and switch 110, wherein these are switched on but switch 106 is switched off. The on-time of switch 110 may be denoted as $t_{Q2}$. Following this on-time, a subsequent switching cycle may be performed.

Control circuit 206 or control circuit 128 may detect trip event 401. Control circuit 206 or control circuit 128 may then truncate or terminate the on-time of first leg 104 and switch 106 responsive to detection of the trip event 401, turning switch 106 off. Control circuit 206 or control circuit 128 may then issue the DTL signal. Control circuit 206 or control circuit 128 may then cause second leg 112 and switch 110 (also denoted as $Q_2$) to be switched on for the same amount of time, which time is denoted $t_{Q2}$, as first leg 104 and switch 106 was switched on. Thus, $t_{Q2}$ may be equal, or approximately equal, to $t_{Q1}$. DTH and DTL may or may not be the same length of time.

Thus, control circuit 206 or control circuit 128 is to match the on-time period ($t_{Q1}$) of first leg 104 of an LLC power converter and the on-time period ($t_{Q2}$) of second leg 112 of the LLC power converter within a given single switching period of the LLC power converter.

Figure 5:
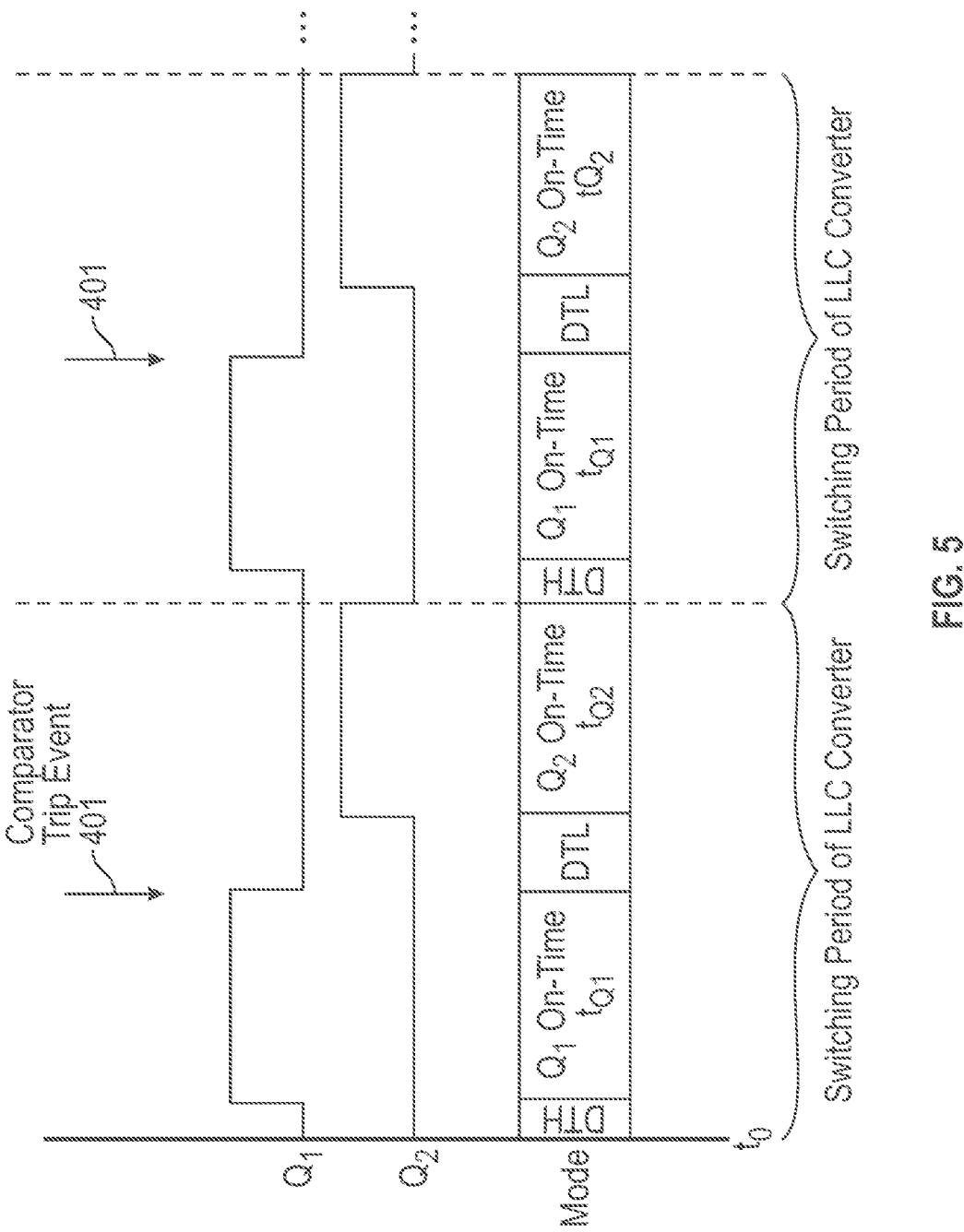
FIG. 5 is an illustration of timing of operation of a control circuit over multiple switching periods, according to examples of the present disclosure.

FIG. 5 is an illustration of timing of operation of control circuit 206 or control circuit 128 over multiple switching periods, according to examples of the present disclosure.

Illustrated are a PWMH signal for $Q_1$, (i.e., switch 106) in first leg 104, and a PWML signal for $Q_2$, (i.e., switch 110) in second leg 112.

Beginning at $t_0$, control circuit 206 or control circuit 128 may issue a signal to both $Q_1$ and $Q_2$ to turn off for duration DTH. After duration DTH, control circuit 206 or control circuit 128 may issue an ON signal to $Q_1$ while keep $Q_2$ off. After comparator 304 issues a trip event 401, control circuit 206 or control circuit 128 may truncate the ON signal to $Q_1$, which may have occurred at a time $t_{Q1}$ after DTH ended. Control circuit 206 or control circuit 128 may issue an OFF signal to both $Q_1$ and $Q_2$ for a duration of DTL. After DTL, control circuit 206 or control circuit 128 may issue an ON signal to $Q_2$ for a duration of $t_{Q1}$, while keeping $Q_1$ off, which means that $t_{Q2}$ is equal to or approximately equal to $t_{Q1}$.

In a subsequent cycle, control circuit 206 or control circuit 128 may issue an OFF signal to both $Q_1$ and $Q_2$ for a duration of DTH. After DTH, control circuit 206 or control circuit 128 may issue an ON signal to $Q_1$ while keeping $Q_2$ off. After comparator 304 issues a trip event 401, control circuit 206 or control circuit 128 may truncate the ON signal to $Q_1$, which may have occurred at a time $t_{Q1}$ after DTH ended. Control circuit 206 or control circuit 128 may issue an OFF signal to both $Q_1$ and $Q_2$ for a duration of DTL. After DTL, control circuit 206 or control circuit 128 may issue an ON signal to $Q_2$ for a duration of $t_{Q1}$ while keeping $Q_1$ off, which means that $t_{Q2}$ is equal to or approximately equal to $t_{Q1}$.

Thus, control circuit 206 or control circuit 128 may match the on-time period of first leg 104 of an LLC power converter and the on-time period of second leg 112 of the LLC power converter within a given single switching period for two or more consecutive switching periods of the LLC power converter.

Figure 6:
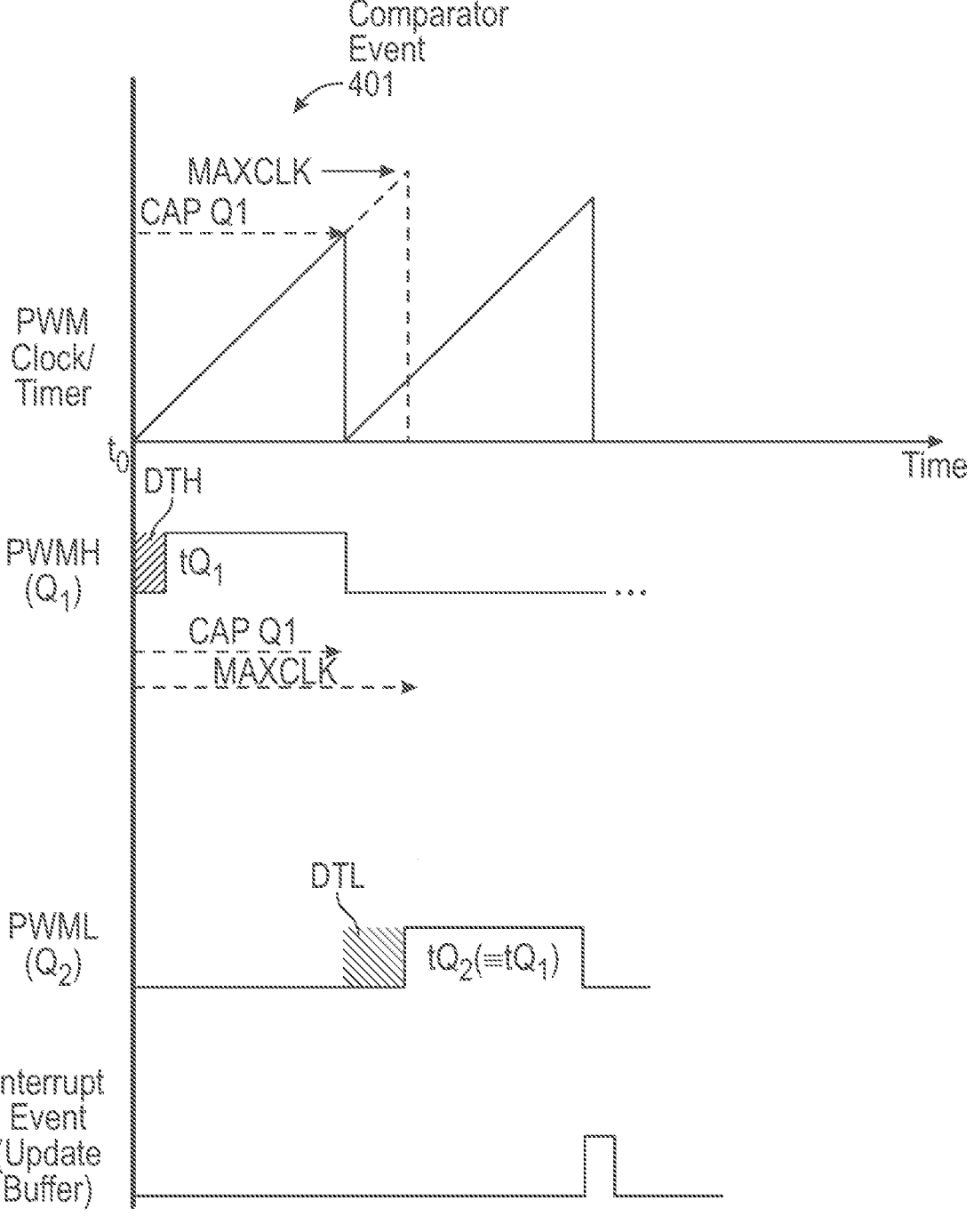
FIG. 6 is an illustration of the timing of an example timer to be used by a control circuit, according to examples of the present disclosure.

In FIG. 5, $t_{Q1}$ in the first cycle (and thus $t_{Q2}$ in the first cycle) may be of a different length than the $t_{Q1}$ in the second cycle (and thus $t_{Q2}$ in the second cycle), as $t_{Q1}$ may be recalculated in each cycle. FIG. 6 is an illustration of further timing of operation and calculations of control circuit 206 or control circuit 128, according to examples of the present disclosure.

Control circuit 206 or control circuit 128 may make use of any suitable timing or clock circuitry, such as a timer, to determine the timing of events and generating PWM signals, e.g., PWMH and PWML.

Illustrated in FIG. 6 is the timing of an example timer to be used by control circuit 206 or control circuit 128. Also illustrated are associated PWMH and PWML signals, as well as an interrupt signal that may be issued by control circuit 206 or control circuit 128 upon completion of an update of various registers or values.

The timer may begin operating upon the start of the switching cycle, such as to. The timer may begin counting. The timer may count to a maximum value, given by MAXCLK. If timer reaches MAXCLK without any other intervening action occurring (as described below), control circuit 206 or control circuit 128 may switch from operating PWMH to operating PWML, with an intervening deadtime, DTL. Before the timer reaches MAXCLK, if comparator 304 trip event 401 occurs, as described above, control circuit 206 or control circuit 128 may truncate the on-time of PWMH. Moreover, the timer value may be captured at this moment in time. The timer value captured at this moment in time may be stored in a register and may be referred to as CAPQ1. The on-time value of PWMH may be calculated as CAPQ1 less DTH, which is equal to $t_{Q1}$. Control circuit 206 or control circuit 128 may issue OFF signals to both $Q_1$ and $Q_2$ for time duration DTL and then the timer may begin counting again. After conclusion of duration $t_{Q1}$, control circuit 206 or control circuit 128, the switching cycle may end and PWML on-time may end. Control circuit 206 or control circuit 128 may issue an interrupt event upon conclusion of the switching cycle to update a buffer. Such a buffer may include values for registers for peripherals of the system in which LLC converter 100 implemented. Such values may include settings not discussed in the present disclosure, such as a PWM duty cycle, a DAC output value register, or a timer period.

Figure 7:
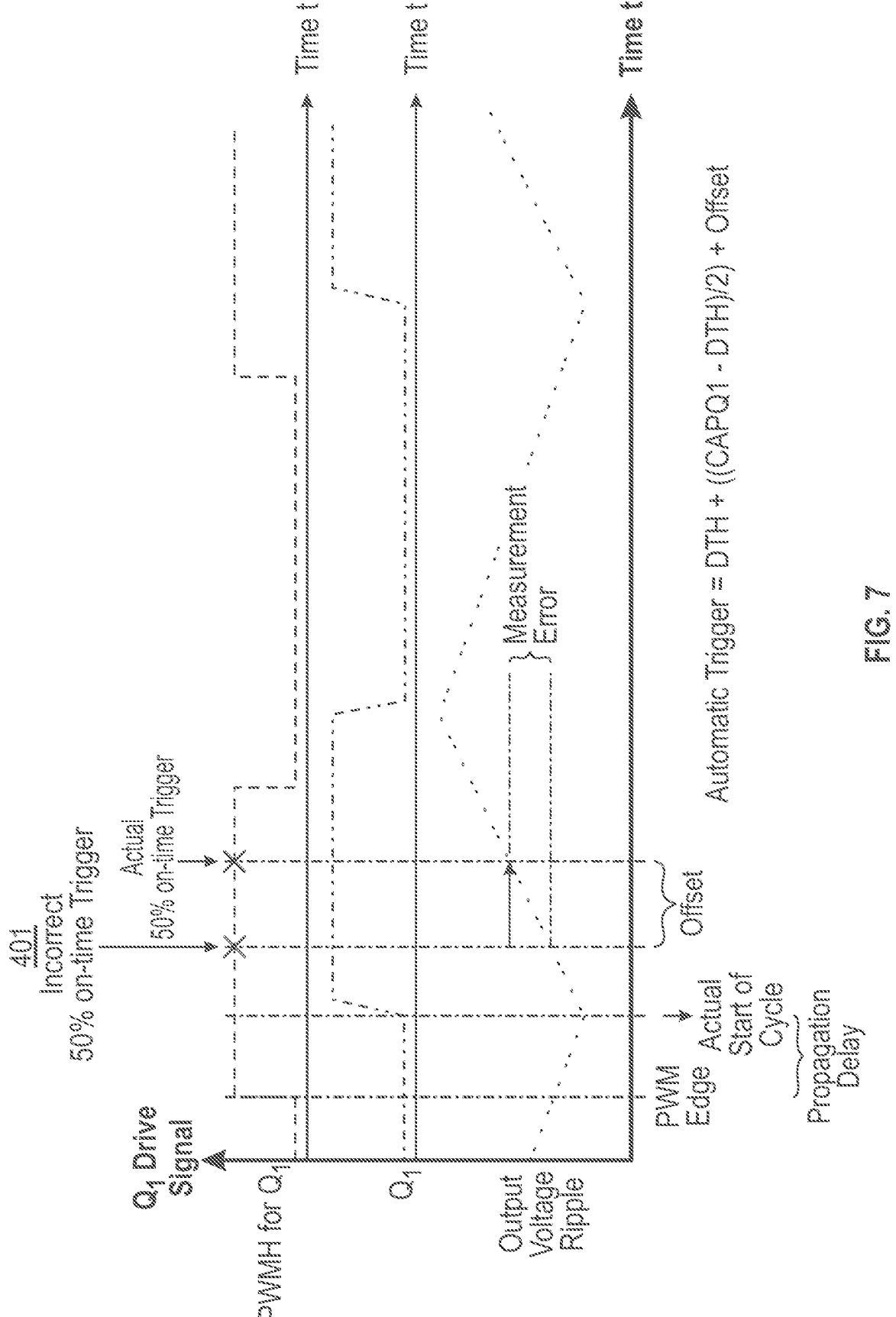
FIG. 7 is an illustration of propagation delay with respect to the LLC power converter switching cycle, according to examples of the present disclosure.

FIG. 7 is an illustration of accommodation of propagation delay with respect to the switching cycle, according to examples of the present disclosure. FIG. 7 illustrates how a propagation delay, which may arise from a switch turning on, may affect the measurement of $V_{FB}$ and subsequently cause ripple voltage therein. As $V_{FB}$ may be ultimately driven by periodic signals in the form of PWM signals to the switches, and moreover, as these PWM signals (and thus $V_{FB}$) may vary in terms of frequency, sampling of $V_{FB}$ may be performed at a same part of a switching cycle of the PWM signals in each cycle. Failure to do so may cause ripple voltage in measurements that causes inaccuracy in the measurement of $V_{FB}$. Designers may attempt to sample $V_{FB}$ at a point in time corresponding to the 50% point of an on period of a PWM signal, during each switching cycle. However, propagation delays in turning on switches may cause such sampling to not be at exactly 50% of the on period of the issued PWM.

Illustrated in FIG. 7 are PWMH, the actual operation of $Q_1$ (on or off), and the output voltage ripple of $V_{FB}$.

Upon issuance of PWMH from control circuit 206 or control circuit 128 to first leg 104, there may be a propagation delay until an actual start of a cycle as represented in the operation of Q1. Furthermore, upon trip event 401 at the timer value CAPQ1, the actual midpoint of the on-cycle of $Q_1$ might not have been reached. There may be measurement error of arising from this difference with the actual midpoint of the cycle, and this error may arise from the propagation delay. Accordingly, an offset, given as OFFSET, may be calculated to accommodate this error. The correct moment in time when sampling of $V_{FB}$ by ADC 302 may be calculated as a time given as DTH+((CAPQ1−DTH)/2)+OFFSET. Voltage sampling of $V_{FB}$ by ADC 302 may be made at this time. This may be performed by, for example, setting an automatic trigger of ADC 302 by PWM control logic 306. Thus, PWM control logic 306 may specify when ADC 302 is to sample $V_{FB}$, and use of the above technique may facilitate sampling $V_{FB}$ in a same 50% part of an ON cycle in each switching cycle, even though the PWM signals may change in frequency over time.

FIG. 8 illustrates a flow chart of an example method 800 for the PWM charge current control in LLC resonant converters. According to one example, method 800 may begin at block 805. Teachings of the present disclosure may be implemented in a variety of configurations of LLC power converter 100. As such, the initialization point for method 800 and the order of 805-850 comprising method 800 may depend on the implementation chosen.

According to an example, at block 805, the LLC power converter may measure a current input indication. The current input indication may represent a current passing through of a primary side of the LLC power converter. At block 810, the LLC power converter may receive a voltage input. The voltage input may include a representative voltage to be provided from a secondary side of the LLC power converter. At block 815, the LLC power converter may measure the voltage input. At block 820, the LLC power converter may compare the voltage input against a reference voltage to determine a voltage error. At block 825, the LLC power converter may use the voltage error to determine a reference current. At block 830, the LLC power converter may compare the reference current with the current input indication. At block 835, when the current input indication is greater than or equal to the reference current, the LLC power converter may end the on-time period of the first leg of the LLC power converter.

At block 840, the LLC power converter may determine the timing of the on-time period of the first leg of the LLC power converter, including determining a first time since a beginning of a switching period of the LLC power converter until the determination that the input current is greater than or equal to the reference current. The first time may include a designated dead-time for the first leg followed by the on-time period of the first leg of the LLC power converter.

At block 845, the LLC power converter may apply the timing of the on-time period of the first leg of the LLC power converter to the second leg of the LLC power converter to match an on-time period of a first leg of the LLC power converter and an on-time period of a second leg of the LLC power converter based upon the current input indication and the voltage input within a given single switching period, i.e. the current input indication and the voltage input of the first leg of the LLC power converter, including using the first time to set a second time, the second time to be used to set the on-time period of the second leg of the LLC power converter. The LLC power converter may set the on-time period of the second leg of the LLC power converter according to the on-time period of the first leg of the LLC power converter.

At block 850, the LLC power converter may generate PWM control signals for the LLC power converter responsive to the determined on-time period of the first leg of the LLC power converter and the determined on-time period of the second leg of the LLC power converter.

Although FIG. 8 discloses a particular number of operations related to method 800, method 800 may be executed with greater or fewer operations than those depicted in FIG. 8. In addition, although FIG. 8 discloses a certain order of operations to be taken with respect to method 800, the operations comprising method 800 may be completed in any suitable order.

Method 800 may be implemented using LLC power converter 100 or any other system operable to implement method 800. Although examples have been described above, other variations and examples may be made from this disclosure without departing from the spirit and scope of these disclosed examples.

The present disclosure has been described in terms of one or more examples, and it should be appreciated that many equivalents, alternatives, variations, and modifications, aside from those expressly stated, are possible and within the scope of the disclosure. While the present disclosure is susceptible to various modifications and alternative forms, specific examples thereof have been shown in the drawings and are herein described in detail. It should be understood, however, that the description herein of specific examples is not intended to limit the disclosure to the particular forms disclosed herein.

What is claimed is:

1. An apparatus, comprising:
a current input interface to receive a current input indication, the current input indication to include a voltage to represent a current passing through of a primary side of an inductor-inductor-capacitor (LLC) power converter;
a voltage input interface to receive a voltage input, the voltage input to include a representative voltage to be provided from a secondary side of the LLC power converter; and
a control circuit to generate pulsed-width modulation (PWM) control signals for the LLC power converter, the PWM control signals to:
initiate an on-time period of a first leg of the LLC power converter;
truncate the on-time period of the first leg of the LLC power converter after a truncated on-time period, the truncated on-time period based on the current input indication and the voltage input;
initiate an on-time period of a second leg of the LLC power converter following a duration of time when the first leg and the second leg are off; and
match the truncated on-time period of the first leg of the LLC power converter and the on-time period of the second leg of the LLC power converter, the on-time period of the second leg of the LLC power converter approximately equal to the truncated on-time period of the first leg of the LLC power converter.

2. The apparatus of claim 1, wherein the control circuit is to match the truncated on-time period of the first leg of the LLC power converter and the on-time period of the second leg of the LLC power converter within a given single switching period of the LLC power converter.

3. The apparatus of claim 1, wherein the control circuit is to match the truncated on-time period of the first leg of the LLC power converter and the on-time period of the second leg of the LLC power converter within a given single switching period of the LLC power converter for a plurality of consecutive switching periods of the LLC power converter.

4. The apparatus of claim 1, wherein the control circuit is to match the truncated on-time period of the first leg of the LLC power converter and the on-time period of the second leg of the LLC power converter by determining the timing of the truncated on-time period of the first leg of the LLC power converter and applying the timing of the truncated on-time period of the first leg of the LLC power converter to the second leg of the LLC power converter.

5. The apparatus of claim 1, wherein the control circuit is to:

measure the voltage input;

compare the voltage input against a reference voltage to determine a voltage error;

use the voltage error to generate a reference current;

compare the reference current with the current input indication; and wherein the PWM control signals to truncate the on-time period of the first leg of the LLC power converter when the current input indication is greater than or equal to the reference current.

6. The apparatus of claim 1, wherein the control circuit is to:

based on a determination that the current input indication is greater than or equal to a reference current, determine a first time since a beginning of a switching period of the LLC power converter until the determination that the current input indication is greater than or equal to the reference current; and use the first time to set a second time, the second time to be used to set the on-time period of the second leg of the LLC power converter.

7. The apparatus of claim 6, wherein the first time is to include a designated dead-time for the first leg followed by the truncated on-time period of the first leg of the LLC power converter.

8. The apparatus of claim 7, wherein the control circuit is to set the on-time period of the second leg of the LLC power converter according to the truncated on-time period of the first leg of the LLC power converter.

9. The apparatus of claim 6, wherein the control circuit is to:

determine the truncated on-time period of the first leg of the LLC power converter from the first time; and set the on-time period of the second leg of the LLC power converter to be the truncated on-time period of the first leg of the LLC power converter.

10. The apparatus of claim 9, wherein the control circuit is to set the second time to be a designated dead-time of the second leg of the LLC power converter followed by the truncated on-time period of the first leg of the LLC power converter.

11. The apparatus of claim 1, wherein the control circuit is to determine an automatic trigger for sampling the voltage input, wherein:

the automatic trigger is set according to an elapsed time from when a PWM signal is sent to the first leg of the LLC power converter to initiate the on-time period of the first leg of the LLC power converter until the current input indication is greater than or equal to a reference current plus an offset, wherein the offset is equal to a difference in time between when the current input indication is greater than or equal to the reference current and when a midpoint of the current input indication occurs in a given rise or fall period.

12. A method, comprising:

receiving a current input indication, the current input indication to indicate a voltage to represent a current passing through of a primary side of an inductor-inductor-capacitor (LLC) power converter;

receiving a voltage input, the voltage input to include a representative voltage to be provided from a secondary side of the LLC power converter;

generating pulsed-width modulation (PWM) control signals for the LLC power converter to initiate an on-time period of a first leg of the LLC power converter;

generating PWM control signals to truncate the on-time period of the first leg of the LLC power converter after a truncated on-time period, the truncated on-time period based on the current input indication and the voltage input; and generating PWM control signals to initiate an on-time period of a second leg of the LLC power converter following a duration of time when the first leg and the second leg are off;

generating PWM control signals to match the truncated on-time period of the first leg of the LLC power converter and the on-time period of the second leg of the LLC power converter, the on-time period of the second leg of the LLC power converter approximately equal to the truncated on-time period of the first leg of the LLC power converter.

13. The method of claim 12, comprising matching the truncated on-time period of the first leg of the LLC power converter and the on-time period of the second leg of the LLC power converter within a given single switching period of the LLC power converter.

14. The method of claim 12, comprising matching the truncated on-time period of the first leg of the LLC power converter and the on-time period of the second leg of the LLC power converter within a given single switching period of the LLC power converter for a plurality of consecutive switching periods of the LLC power converter.

15. The method of claim 12, comprising matching the truncated on-time period of the first leg of the LLC power converter and the on-time period of the second leg of the LLC power converter by determining the timing of the truncated on-time period of the first leg of the LLC power converter and applying the timing of the truncated on-time period of the first leg of the LLC power converter to the second leg of the LLC power converter.

16. The method of claim 12, comprising:

measuring the voltage input;

comparing the voltage input against a reference voltage to determine a voltage error;

using the voltage error to determine a reference current;

comparing the reference current with the current input indication; and wherein the generating PWM control signals to truncate the on-time period of the first leg of the LLC power converter comprises generating PWM control signals to truncate the on-time period of the first leg of the LLC power converter when the current input indication is greater than or equal to the reference current.

17. The method of claim 12, comprising:

based on a determination that the current input indication is greater than or equal to a reference current, determining a first time since a beginning of a switching period of the LLC power converter until the determination that the current input indication is greater than or equal to the reference current; and using the first time to set a second time, the second time to be used to set the on-time period of the second leg of the LLC power converter.

18. The method of claim 17, wherein the first time is to include a designated dead-time for the first leg followed by the truncated on-time period of the first leg of the LLC power converter.

19. The method of claim 18, comprising setting the on-time period of the second leg of the LLC power converter according to the truncated on-time period of the first leg of the LLC power converter.

20. An inductor-inductor-capacitor (LLC) power converter, comprising:

a first leg including a first switch;

a second leg including a second switch, the first switch connected between a voltage supply and a midpoint, and the second switch connected between the midpoint and ground;

a transformer including a primary side inductor and a secondary side inductor;

a low side inductor connected between the midpoint and the primary side inductor;

a capacitor connected between the primary side inductor and ground;

a current sensor in series with the capacitor, the primary side inductor and the current sensor to generate a current input indication;

a representative voltage received from the second side inductor;

a control circuit to:

receive the current input indication;

receive the representative voltage; and based upon the current input indication and the representative voltage, generate pulsed-width modulation (PWM) control signals for the first leg and the second leg to:

initiate an on-time period of a first leg of the LLC power converter, truncate the on-time period of the first leg, initiate an on-time period of the second leg of the LLC power converter following a duration of time when the first leg and the second leg are off, and match the on-time period of the second leg and the truncated on-time period of the first leg, the on-time period of the second leg approximately equal to the truncated on-time period of the first leg.

* * * * *